United States Patent
Oh et al.

(10) Patent No.: US 6,741,929 B1
(45) Date of Patent: May 25, 2004

(54) VIRTUAL NAVIGATION SYSTEM AND METHOD USING MOVING IMAGE

(75) Inventors: Byoung Woo Oh, Taejon (KR); Min Soo Kim, Taejon (KR); Young Kyu Yang, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 10/092,902

(22) Filed: Mar. 8, 2002

(30) Foreign Application Priority Data

Dec. 26, 2001 (KR) .......................... 2001-84870

(51) Int. Cl.[7] .............................................. G01C 21/34
(52) U.S. Cl. ....................... 701/209; 382/107; 382/140; 382/214; 382/305; 340/995
(58) Field of Search .................... 701/209, 200, 701/201, 207, 208, 210, 23, 24; 340/990, 993, 995, 998, 903; 370/215, 252; 382/103, 107, 108, 113, 140, 165, 214, 285, 305; 342/357.13; 348/119, 159, 169; 713/200

(56) References Cited

U.S. PATENT DOCUMENTS

| | | | | |
|---|---|---|---|---|
| 6,075,559 A | * | 6/2000 | Harada | .......................... 348/148 |
| 6,285,317 B1 | * | 9/2001 | Ong | .......................... 342/357.13 |
| 6,297,748 B1 | | 10/2001 | Lappenbusch | |
| 6,314,369 B1 | * | 11/2001 | Ito et al. | .......................... 701/209 |
| 6,415,224 B1 | * | 7/2002 | Wako et al. | .......................... 701/208 |
| 2002/0052689 A1 | * | 5/2002 | Yamashita et al. | .......................... 701/211 |
| 2002/0174360 A1 | * | 11/2002 | Ikeda | .......................... 713/200 |
| 2002/0183924 A1 | * | 12/2002 | Yokota | .......................... 701/209 |
| 2003/0028318 A1 | * | 2/2003 | Kaji et al. | .......................... 701/209 |

* cited by examiner

Primary Examiner—Thomas G. Black
Assistant Examiner—Tuan C To
(74) Attorney, Agent, or Firm—Jacobson Holman PLLC

(57) ABSTRACT

Disclosed is a virtual navigation system using a moving image. The system comprises an input section for inputting a command information such as a departure point and a destination each related to a traveling route; a traveling route estimating section for reading the traveling route from the departure point to the destination, which is inputted by the input section, from stored data to estimate an optimum traveling route; a traveling route processing section for processing the moving image for a road and surroundings around the road of the traveling route estimated by the traveling route estimating section; an information processing section for searching moving image data and spatial data each related to the road and the surroundings under control of the traveling route processing section; a storing section for storing road data shown in a map, and the moving image data and the spatial data related to the road and the surroundings.

14 Claims, 2 Drawing Sheets

VIRTUAL NAVIGATION SYSTEM AND METHOD USING MOVING IMAGE

BACKGROUND OF THE INVENTION

1. Field of the Invention

The present invention relates to a virtual navigation system and method capable of realizing an actual environment by use of a moving image, and more particularly, to a system of virtually navigating using a moving image, in which the moving image taken when actually driving along a route is stored, and actual road information is displayed by use of the moving image related to a traveling route from a departure point to a destination, thereby exactly guiding the traveling route.

2. Background of the Related Art

Generally, in order to acquire the information on a road of which although a user have been to the road the user has a poor memory, or of which a user is unfamiliar with the road because of the first time to the road, the user utilizes a map or a rough map. However, it is difficult to search a destination itself by use of the map or rough map. In addition, since the map or rough map provides simple information, it is inadequate for the complex road.

In order to solve the drawback described above, a topographical searching system or route searching system has been developed. The topographical searching system is to display the information on the destination inputted by the user and a map around the destination. The route searching system is to search and display a traveling route from a departure point to a destination, the information of which is inputted by the user.

In case of the prior topographical searching system and the route searching system, however, the information on the surroundings of the destination or a two-dimensional map on the route information from the departure point to the destination is provided. Accordingly, the cognitive faculty is reduced due to a disparate feeling between the map displayed by the system and an actual road, and the system may not provide the user with a sufficient traveling experience. In particular, it is difficult to communicate the accurate information on an overpass, an underground roadway, or a rotary by the two-dimensional map.

A prior car navigation system (CNS) guides a traveling route from a departure point to a destination through a two-dimensional map and a sound, depending upon a location of a vehicle during the drive.

Since the CNS provides the two-dimensional map, similar to the topographical searching system or route searching system, however, it is difficult to communicate the accurate information. In particular, if the eyes of the drive are focused on the CNS during the drive, the driver acts against the traffic regulations, as well as leading to hinder the safe driving. It is preferable for a driver to have an experience on the traveling route prior to the driving.

Furthermore, according to the prior art related to the topographical searching system, the route searching system, and the CNS, the technique using an actual photography provides not actual moving image reflecting the surroundings which is visually varied according to the traveling direction when traveling on a road, but a still image or a moving image obtained from a fixed camera, in order to guide a special point.

SUMMARY OF THE INVENTION

Accordingly, the present invention is directed to a virtual navigation system and method capable of realizing an actual environment by use of a moving image that substantially obviates one or more problems due to limitations and disadvantages of the related art.

An object of the present invention is to provide a virtual navigation system and method providing a moving image of a road, which a user actually experiences during the drive, as well as a two-dimensional map, to undergo the virtual navigation, such as traveling on a road, turning at a diverging point and a crossroad, traveling on a rotary, entry to an underground roadway, identifying of a location of an overspeed preventing protrusion, or the like, thereby inaccurately communicating the information as compared with the prior art.

Another object of the present invention is to provide a virtual navigation system and method using a moving image, in which even though an expensive CNS equipment is not installed in a vehicle, it is possible to have an experience of the virtual navigation through a personal computer, a personal digital assistant (PDA), a mobile communication terminal, Internet or the like.

To achieve the object and other advantages, according to one aspect of the present invention, there is provided a virtual navigation system using a moving image, the system comprising: input means for inputting a command information such as a departure point and a destination each related to a traveling route; traveling route estimating means for reading the traveling route from the departure point to the destination, which is inputted by the input means, from stored data to estimate an optimum traveling route; traveling route processing means for processing the moving image for a road and surroundings around the road of the traveling route estimated by the traveling route estimating means; information processing means for searching moving image data and spatial data each related to the road and the surroundings under control of the traveling route processing means; storing means for storing road data shown in a map, and the moving image data and the spatial data related to the road and the surroundings; and output means for displaying the moving image and the spatial data related to the traveling route transferred from the traveling route processing means.

According to another aspect of the present invention, there is provided a method of providing information of a virtual navigation using a moving image, to provide an experience of the virtual navigation on a route to be traveled, the method comprising the steps of: searching designated records around a road and a diverging point in a traveling route by an external input signal inputted a departure point and a destination, and generating a list of searched records; sequentially accessing to the records along the traveling route among the generated list; reading moving image data and spatial data each related to the road and a surroundings around the road, the data recorded in the accessed list; replaying the moving image data and the spatial data on a screen in proportion to a constant vehicle speed; and sequentially replaying the moving image for a next accessed record, if the replay of the moving image for the accessed record is completed, to continuously replay the moving image from the departure point to the destination; wherein a virtual traveling route from the departure point to the destination is provided by the method, and the moving image for the surroundings around the road and the moving image for change of the surroundings according to a vehicle speed are provided in a nearly similar to an actual circumstance, so that a user has the experience of the virtual navigation.

According to further another aspect of the present invention, there is provided a method of providing information of a virtual navigation using a moving image, to provide an experience of the virtual navigation on a route to be traveled, the method comprising the steps of: reading the moving image file and spatial data corresponding to the entire traveling route according to an external input signal in which a departure point and a destination are inputted, to generate one file; reading moving image data and spatial data each related to a road and a surroundings around the road from storing means, the data recorded in the file; and replaying the moving image data and the spatial data on a screen in proportion to a constant vehicle speed; wherein a virtual traveling route from the departure point to the destination is provided by the method, and the moving image for the surroundings around the road and the moving image for change of the surroundings according to a vehicle speed are provided in a nearly similar to an actual circumstance, so that a user has an experience of a virtual navigation.

According to the construction and process, the present invention is characterized in that by constructing an actual moving image for diverging points along a traveling direction, such as a crossroad, a rotary, an overpass, an underground roadway or the like, or all of traveling possible cases, and by searching and combining the moving image for the road from the departure point to the destination and the moving image for the traveling direction of the diverging point, the driver has an experience of the virtual navigation on the routed to be traveled.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
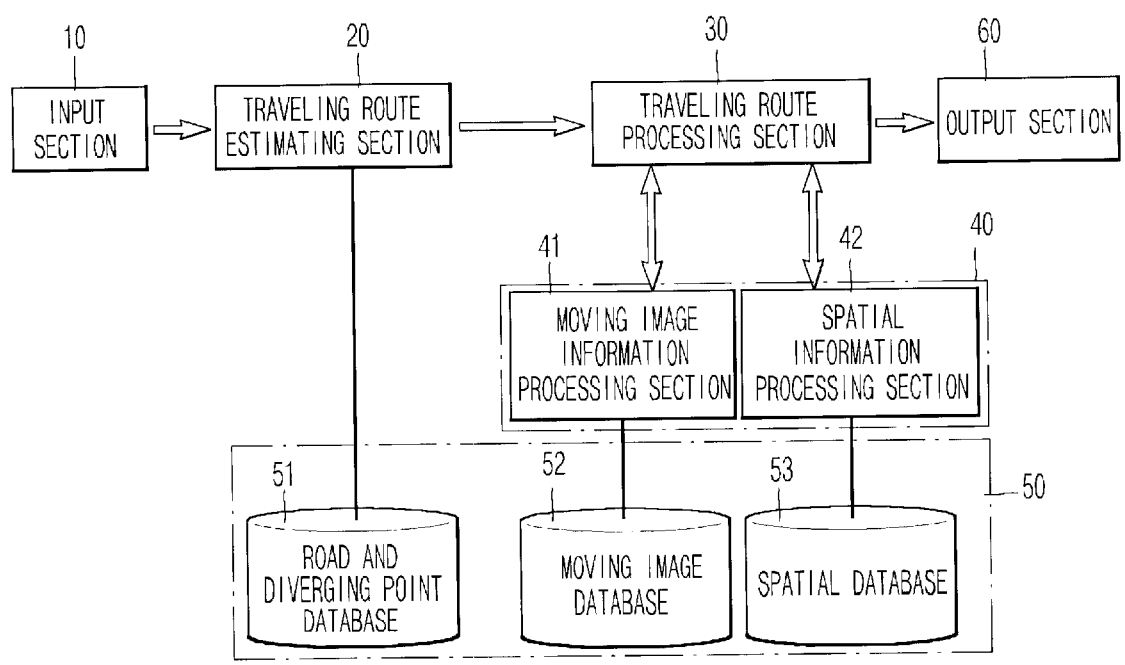
FIG. 1 is a block diagram of a virtual navigation system using a moving image according to the present invention.

A virtual navigation system using a moving image according to one preferred embodiment of the present invention will now be explained with reference to the accompanying drawings. FIG. 1 is a block diagram of a virtual navigation system using a moving image according to the present invention.

Referring to FIG. 1, the virtual navigation system of the present invention comprises an input section 10 for inputting a departure point and a destination each related to a traveling route information output, a traveling route estimating section 20 for estimating a traveling route from the departure point to the destination, the traveling route inputted by the input section, a traveling route processing section 30 for controlling a display of a map and an moving image according to movement of the traveling route until arriving at the destination, an information processing section 40 for searching data related to the movement of the traveling route in a storage section under the control of the traveling route processing section 30, a storage section 50 for storing data related to the traveling route, and an output section 60 for displaying the map and the moving image transferred from the traveling route processing section 30.

The information processing section 40 includes a moving image information processing section 41 for searching the moving image related to the traveling route and transferring the searched moving image to the traveling route processing section 30, and a spatial information processing section 42 for searching spatial data around the traveling route and transferring the searched spatial data to the traveling route processing section 30.

The storing section 50 includes a road and diverging point database 51 for storing a record containing spatial data of a road and diverging point, a moving image database 52 for storing a moving image by a traveling possible direction of the road and diverging point, and a spatial database 53 for storing spatial data to display the map depending upon the traveling route.

With the construction described above, if a user inputs the information on the departure point and destination through the input section 10, the traveling route estimating section 20 reads the corresponding data from the road and diverging point database 51 to calculate the optimum traveling route from the departure point to the destination, and generates an ordered list consisting of via roads and diverging points.

In calculating the optimum traveling route, it may be in preference to a distance or time, according to a request of the user. When the optimum traveling route is calculated depending upon the preference of time, velocity data by a road is acquired and employed from an intelligent transport system (ITS).

The road and diverging point database 51 consists of road data and diverging point data.

The road data is a set of records for roads between two diverging points, and it classifies even one road according to the traveling direction. For example, the Kyongbu Expressway (Seoul to Pusan) is divided by the diverging point and an interchange, and since the highway is classified into a northbound side and a southbound side, the southbound side from the Shytanjin Interchange to the Hoedeok Diverging-point is classified as one road record.

The diverging point data is a set of records on the connecting vicinity of two or more roads such as a crossroad, a ramp of an overpass, a traffic circle or the like, and even the same diverging point is classified depending upon each road.

For example, in case of a crossroad with no left-hand turn, the crossroad may be classified into three types, i.e., a straight drive, a U-turn, and a right-hand turn. In case of the ramp of the overpass, it may be classified into two types, i.e., the overpass and a road under the overpass and connected to the overpass. Each of road records and diverging point records is recorded with a reference capable of accessing to the moving image data such as file name of the moving image, as well as a basic attribute such as name of the road, speed limit, current speed, suspension of traffic or the like.

The traveling route processing section 30 processes a list of optimum routes generated by the traveling route estimating section 20. The list of optimum traveling routes consists of a plurality of records of roads and diverging points that are existed in the traveling route from the departure point to the departure.

For example, the optimum traveling route consists of a road A and a left-hand turn at a diverging point B, a road C and a straight drive at a diverging point D, a road E and an entry into an overpass at a diverging point F, and an overpass G and the like. The traveling route processing section 30 sequentially accesses to the list of road or diverging point records from the departure point to the destination, and requesting and searching the moving image data and spatial data related to the road and diverging point record in the moving image information processing section 41 and the spatial information processing section 42 to the searched moving image data and spatial data to the output section 60.

Since the road and the diverging point are connected to each other, it is unnecessary to search the spatial data every time. In case that it is unnecessary to update a surrounding map which is already displayed, the request of the spatial data from the spatial information processing section 42 will be omitted to improve its performance.

The moving image processing section 41 is received with the road or diverging point record from the traveling route processing section 30, and searches the moving image in the moving image database 52 to transfer the searched moving image to the traveling route processing section 30.

The moving image database 52 stores the moving image established every the road record and the diverging point record. The moving image is stored as one file for one road record or one diverging point record.

Specifically, the road record is recorded with a reference capable of accessing to the file of the actual moving image taken when driving on the road between diverging points along a traveling route, while the diverging point record is recorded with a reference capable of accessing to the file of the actual moving image taken when entering from one road into the other road.

For example, the moving image is acquired, while a vehicle with a camera installed travels on the road A, turns to the left at the crossroad B, and travels on the road C. The moving image taken when traveling to the crossroad B is stored as the moving image of the road A, the traveling direction of which is identical to each other. The moving image taken when turning to the left at the crossroad B and traveling to the road C is stored as the moving image of the converging point B connecting the roads A and C. And, the moving image taken after the diverging point B is stored as the moving image of the road C, the traveling direction of which is identical to each other.

When constructing the moving image database 52, each moving image data may be not constructed as a file, but integrated into the road and diverging point database 51. In other words, the road and diverging point data may be defined by a binary large object (BLOB)-typed field for the moving image by use of an object-relational database (ORDB), and stored together with the moving image of each road and diverging point record as a field value.

The spatial information processing section 42 is received with location coordinates of the road or diverging point record from the traveling route processing section 30, and searches the spatial data in the spatial database 53 to return the results. If a coordinate system of the spatial data stored in the spatial database 53 is different from the coordinate system of the location transferred from the traveling route processing section 30, the coordinate transformation is carried out to acquire the spatial data around there.

The spatial database 53 stores various spatial data such as topography, satellite photography, ITS information or the like.

The output section 60 displays the moving image and spatial data received from the traveling route processing section 30 so that the may be seen by the user. When displaying the moving image, a playing speed of the moving image can be controlled by the user, in order to shorten the time required for the virtual navigation.

During displaying the moving image, the location of the corresponding road or diverging point record is displayed by use of a different color or blink mode so that the user can clearly know as to whether the moving image of a certain location is played at present.

Figure 2:
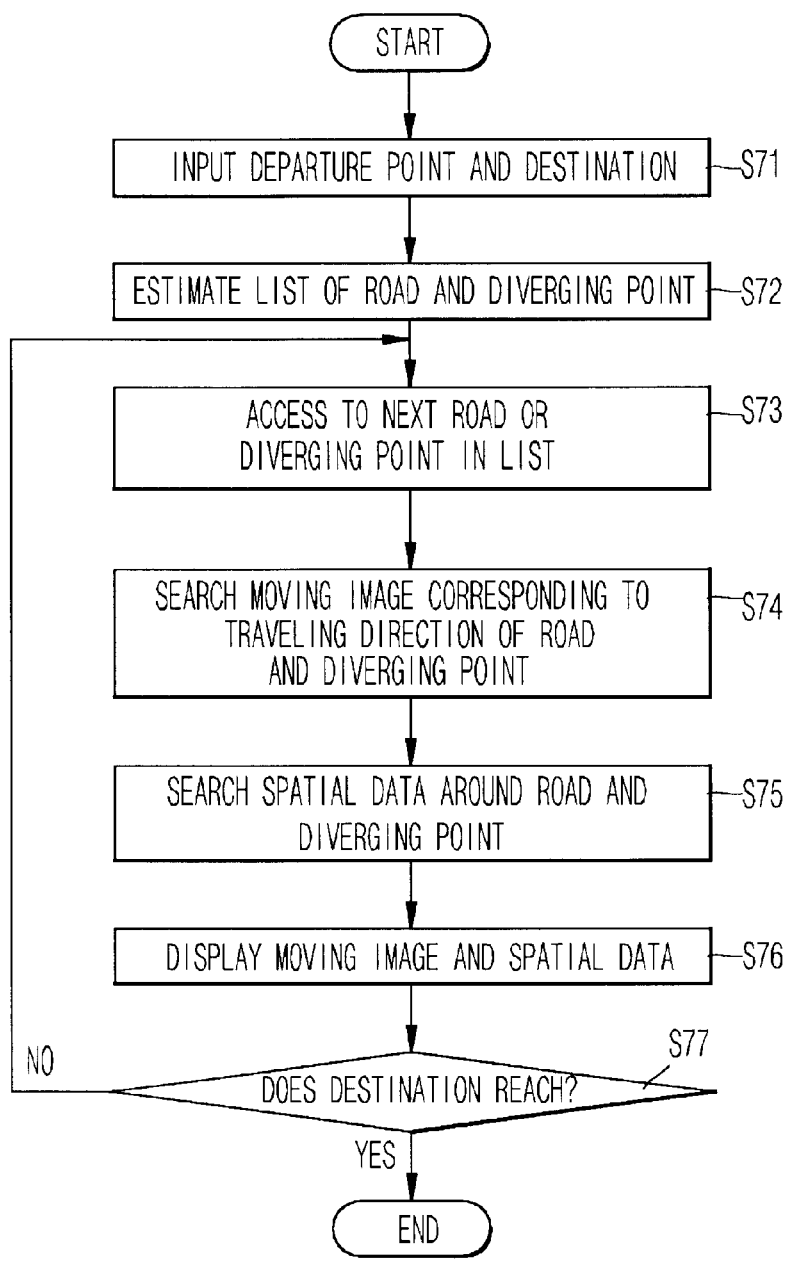
FIG. 2 is a flow chart of a virtual navigation system of the present invention.

FIG. 2 is a flow chart of a virtual navigation system of the present invention. Referring to FIG. 2, the operation of the virtual navigation system of the present invention is started by inputting the departure point and the destination through the user (step S71).

In the method of inputting the departure point and the destination, the departure point and the destination are inputted by various methods, that is, clicking a mouse on the map, inputting a name of a topography, automatically inputting the current location by use of a global positioning system (GPS), or selecting a predetermined location.

If the departure point and the destination related to the traveling route are inputted, the traveling route estimating section 20 searches the record for the corresponding traveling route from the road and diverging point database 51, based on the departure point and the destination inputted from the input section 10, to calculate the optimum traveling route from the departure point to the destination, and generates an ordered list consisting of each road and diverging point depending upon the traveling direction (step S72).

If the optimum list of traveling route is generated by the traveling route estimating section 20 in the step S72, the traveling route processing section 30 sequentially accesses to the optimum traveling route, and request the information of the moving image for the accessed traveling route from the moving image information processing section 41 (step S73).

The moving image information processing section 41 searches the moving image corresponding to the road or diverging point from the moving image database 52 based on the road and diverging point record accessed by the traveling route processing section 30, according to the request of the moving image of the traveling route processing section 30, and transfers the searched moving image to the traveling route processing section 30 (step S74).

In like manner, the traveling route processing section 30 requests the spatial data in the spatial information processing section 42, and the spatial information processing section 42 searches the spatial data based on the location of the road or diverging point accessed by the traveling route processing section 30, and transfers the searched spatial data to the traveling route processing section 30 (step S75).

And then, the traveling route processing section 30 displays the moving image transferred from the moving image information processing section 41 and the spatial data transferred from the spatial information processing section 42 through the output section 60 (step S76).

The present invention provides the moving image by the road and diverging point record through the processes of steps 73 to 76, and the above process is repeatedly processed to the destination.

Specifically, according to the system of the present invention, the providing of the moving image from the departure point to the destination is identified by referring to the list accessed by the traveling route processing section 30, as the step S77. In case there is an unprocessed road or diverging point record in the list, the above steps are repeated until the moving image process for the final record is completed, thereby providing the moving image and various spatial data for the entire traveling route. Therefore, the user may experience the actual road to be traveled through the virtual navigation, so that the user can exactly and easily travel to the destination.

With the construction described above, since the system of the present invention displays the actual moving image for a road traveling and a turning point along the traveling route from the departure point to the destination, the user learns concretely and correctly the traveling information such as the entry of the overpass, a location of an overspeed preventing protrusion or the like, thereby being helpful in the safe driving.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A virtual navigation system using an actual moving image of a road previously taken and stored when traveling along a desired route, the system comprising:

input means for inputting a command information such as a departure point and a destination each related to a traveling route;

traveling route estimating means for reading the traveling route from the departure point to the destination, which is inputted by the input means, from stored data to estimate an optimum traveling route;

traveling route processing means for processing the actual moving image for a road and surroundings around the road of the traveling route estimated by the traveling route estimating means;

information processing means for searching moving image data and spatial data each related to the road and the surroundings under control of the traveling route processing means;

storing means for storing road data shown in a map, and the moving image data and the spatial data related to the road and the surroundings; and output means for displaying the actual moving image and the spatial data related to the traveling route transferred from the traveling route processing means.

2. The virtual navigation system as claimed in claim 1, wherein the traveling route estimating means estimates at least one traveling route depending upon an attribute defined to a traveling possible route from the departure point to the destination, provides the estimated optimum traveling route as a first traveling route, and provides other traveling route different from the first traveling route according to a control command of the input means.

3. The virtual navigation system as claimed in claim 1, wherein the traveling route estimating means collects records for each road and diverging point from the departure point to the destination to generate a traveling list.

4. The virtual navigation system as claimed in claim 1, wherein the information processing means includes a moving image information processing section for searching the actual moving image related to the traveling route, and a spatial information processing section for searching the spatial data around the traveling route.

5. The virtual navigation system as claimed in claim 1, wherein the storing means includes a road and diverging point database for storing a record containing spatial data of a road and diverging point, a moving image database for storing the actual moving image related to the surroundings containing the road, and a spatial database for storing the spatial data to display a map of the road and surroundings.

6. The virtual navigation system as claimed in claim 5, wherein the data stored in the storing means is a set of independent records consisting of the road and the diverging point.

7. The virtual navigation system as claimed in claim 5, wherein the road record or the diverging point record is recorded with a reference capable of accessing to the moving image data corresponding to the record.

8. A method of providing information of a virtual navigation using an actual moving image of a road previously taken and stored when traveling along a desired route, to provide an experience of the virtual navigation on a route to be traveled, the method comprising the steps of:

searching designated records around a road and a diverging point in a traveling route by an external input signal inputted a departure point and a destination, and generating a list of searched records;

sequentially accessing to the records along the traveling route among the generated list;

reading moving image data and spatial data each related to the road and a surroundings around the road, the data recorded in the accessed list;

replaying the moving image data and the spatial data on a screen in proportion to a constant vehicle speed; and sequentially replaying the actual moving image for a next accessed record, if the replay of the actual moving image for the accessed record is completed, to continuously replay the actual moving image from the departure point to the destination;

wherein a virtual traveling route from the departure point to the destination is provided by the method, and the actual moving image for the surroundings around the road and the actual moving image for change of the surroundings according to a vehicle speed are provided in a nearly similar to an actual circumstance, so that a user has the experience of the virtual navigation.

9. The method as claimed in claim 8, wherein the list of the records is variable depending upon input information on a distance or a traveling time.

10. The method as claimed in claim 8, wherein the reading step comprises the steps of: searching the actual moving image corresponding to a traveling direction of a traveling road and a diverging point, and searching spatial data for the surroundings according to the traveling road and a location of the diverging portion.

11. A method of providing information of a virtual navigation using an actual moving image of a road previously taken and stored when traveling along a desired route, to provide an experience of the virtual navigation on a route to be traveled, the method comprising the steps of:

reading the moving image file and spatial data corresponding to the entire traveling route according to an external input signal in which a departure point and a destination are inputted, to generate one file;

reading moving image data and spatial data each related to a road and surroundings around the road from storing means, the data recorded in the file; and replaying the moving image data and the spatial data on a screen in proportion to a constant vehicle speed;

wherein a virtual traveling route from the departure point to the destination is provided by the method, and the actual moving image for the surroundings around the road and the actual moving image for change of the surroundings according to a vehicle speed are provided in a nearly similar to an actual circumstance, so that a user has an experience of a virtual navigation.

12. The method as claimed in claim 11, wherein in the file generating step, a list of the records is variable depending upon input information on a distance or a traveling time.

13. A recording medium for executing a method of providing information of a virtual navigation to provide an experience of the virtual navigation on a route to be traveled, the recoding medium capable of being read by a digital processor, and storing a program of commands executed by the digital processor, the program being implemented by types, with the program comprising the steps of;

searching designated records around a road and a diverging point in a traveling route by an external input signal inputted a departure point and a destination, and generating a list of searched records;

sequentially accessing to the records along the traveling route among the generated list;

reading actual moving image data and spatial data each related to the road and surroundings around the road which are previously taken and stored when traveling along the traveling route, the data recorded in the accessed list;

replaying the actual moving image data and the spatial data to show an actual moving image of the road and surroundings on a screen in proportion to a constant vehicle speed; and sequentially replaying the actual moving image for a next accessed record, if the replay of the actual moving image for the accessed record is completed, to continuously replay the actual moving image from the departure point to the destination.

14. A recording medium for executing a method of providing information of a virtual navigation to provide an experience of the virtual navigation on a route to be traveled, the recoding medium capable of being read by a digital processor, and storing a program of commands executed by the digital processor, the program being implemented by types, with the program comprising the steps of:

reading an actual moving image file and spatial data corresponding to the entire traveling route according to an external input signal in which a departure point and a destination are inputted which are previously taken and stored when traveling along the traveling route, to generate one file;

reading actual moving image data and spatial data each related to a road and surroundings around the road from storing means which are previously taken and stored when traveling along the traveling route, the data recorded in the file; and replaying the moving image data and the spatial data on a screen to show an actual moving image of the road and surroundings in proportion to a constant vehicle speed.

* * * * *